(12) United States Patent
Pierson

(10) Patent No.: US 8,523,135 B2
(45) Date of Patent: Sep. 3, 2013

(54) BREAKAWAY DEVICE FOR POSTS

(75) Inventor: Nowal Pierson, Taber (CA)

(73) Assignee: 648560 Alberta Ltd., Vauxhall (CA)

( * ) Notice: Subject to any disclaimer, the term of this patent is extended or adjusted under 35 U.S.C. 154(b) by 20 days.

(21) Appl. No.: 13/082,180

(22) Filed: Apr. 7, 2011

(65) Prior Publication Data

US 2011/0248143 A1 Oct. 13, 2011

(30) Foreign Application Priority Data

Apr. 7, 2010 (CA) .................................... 2699164

(51) Int. Cl.
*F16M 13/00* (2006.01)

(52) U.S. Cl.
USPC ............ 248/548; 248/909; 52/98; 40/611.05; 403/2

(58) Field of Classification Search
USPC ............ 248/548, 529, 533, 900, 909; 52/98, 52/99; 40/608, 611.05; 403/2; 404/10
See application file for complete search history.

(56) References Cited

U.S. PATENT DOCUMENTS

| | | | | | |
|---|---|---|---|---|---|
| 375,412 | A | * | 12/1887 | Creque | 248/159 |
| 1,679,623 | A | * | 8/1928 | Olsen | 40/608 |
| 3,381,427 | A | * | 5/1968 | Watson | 52/98 |
| 4,565,466 | A | * | 1/1986 | Daggs et al. | 404/10 |
| 4,858,876 | A | * | 8/1989 | Moreno | 248/545 |
| 5,484,217 | A | * | 1/1996 | Carroll et al. | 403/2 |
| 5,664,905 | A | * | 9/1997 | Thompson et al. | 404/6 |
| 5,855,443 | A | * | 1/1999 | Faller et al. | 403/2 |
| 5,887,842 | A | * | 3/1999 | Granger | 248/548 |
| 6,113,055 | A | * | 9/2000 | Salman | 248/548 |
| 6,233,898 | B1 | * | 5/2001 | Burlando | 404/9 |
| 6,250,835 | B1 | * | 6/2001 | Chamel | 403/2 |
| 6,308,927 | B1 | * | 10/2001 | Leahy | 248/548 |
| 6,390,436 | B2 | * | 5/2002 | Barnes et al. | 248/548 |
| 6,516,573 | B1 | * | 2/2003 | Farrell et al. | 52/98 |
| 6,540,196 | B1 | * | 4/2003 | Ellsworth | 248/548 |
| 6,739,567 | B1 | * | 5/2004 | Curtis | 248/548 |
| 6,792,708 | B2 | * | 9/2004 | Dicke et al. | 40/610 |
| 7,108,445 | B2 | * | 9/2006 | Henriques | 403/202 |
| 7,434,778 | B2 | * | 10/2008 | Leahy et al. | 248/548 |
| 7,794,123 | B2 | * | 9/2010 | Newbill | 362/431 |
| 2003/0205006 | A1 | * | 11/2003 | Conner et al. | 52/98 |
| 2004/0222339 | A1 | * | 11/2004 | Curtis | 248/158 |
| 2005/0166482 | A1 | * | 8/2005 | Leahy et al. | 52/98 |
| 2006/0228165 | A1 | * | 10/2006 | Yonan, III | 403/2 |
| 2009/0302188 | A1 | * | 12/2009 | Lewis | 248/548 |

* cited by examiner

*Primary Examiner* — Bradley Duckworth
(74) *Attorney, Agent, or Firm* — Thomas E. Malyszko

(57) ABSTRACT

A device that facilitates the support of a post or shaft in such a way that the post is connected rigidly to a foundation or otherwise connected to a fixed position. If a condition arises that causes the post to become stressed physically the device will allow separation of the post from a mounting on the foundation or fixed position before the said post is physically damaged. The post itself may be round, square, rectangular, channel shape, or any other shape in profile. In some cases the post is the primary support for such things as roadside sign posts, signs, signals, lights, warnings, or markers, that are commonly held by the roadside in a fixed and elevated position so that they are easily visible to passing motorists, cyclists, or pedestrians. The device can also be used to support other types of signs, signals, or devices unrelated to traffic or transport.

20 Claims, 8 Drawing Sheets

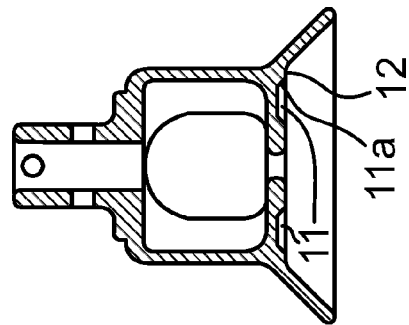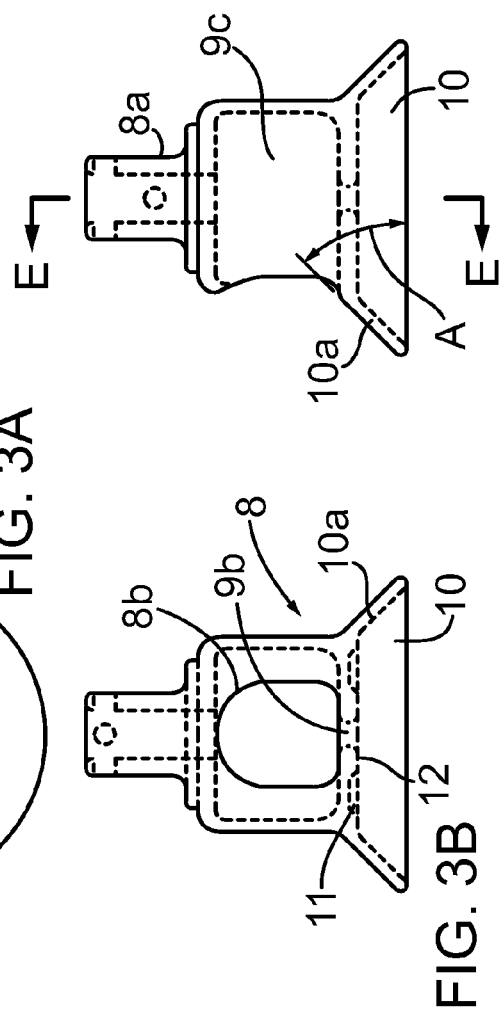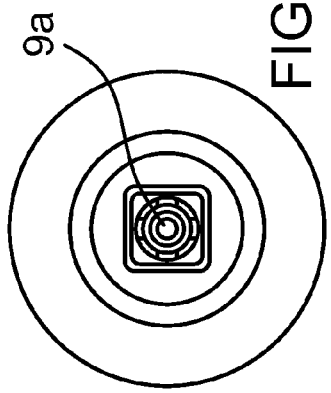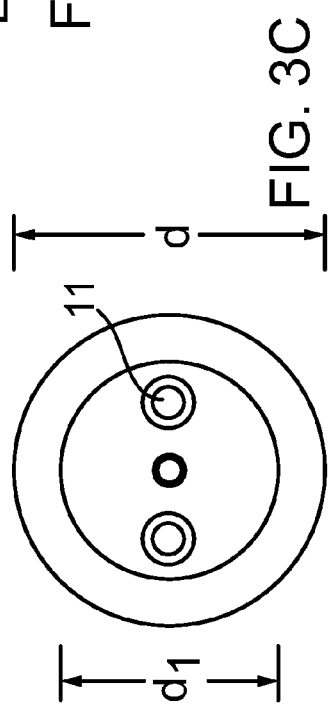

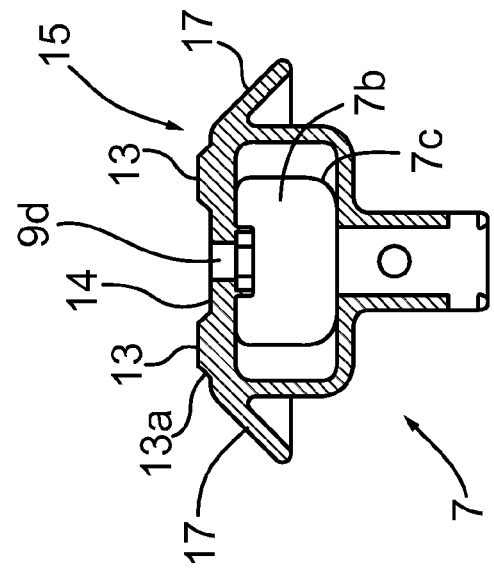
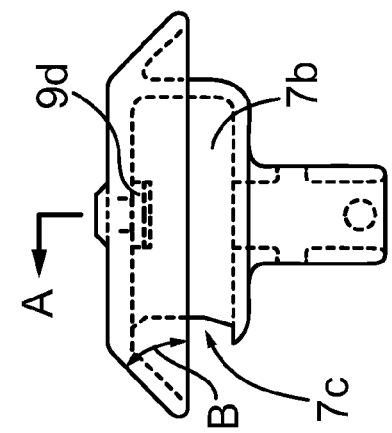
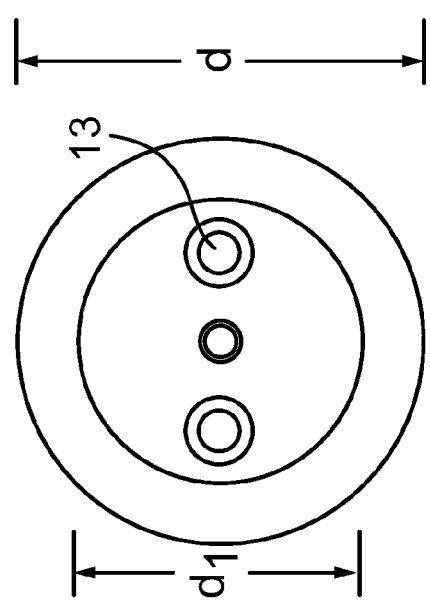
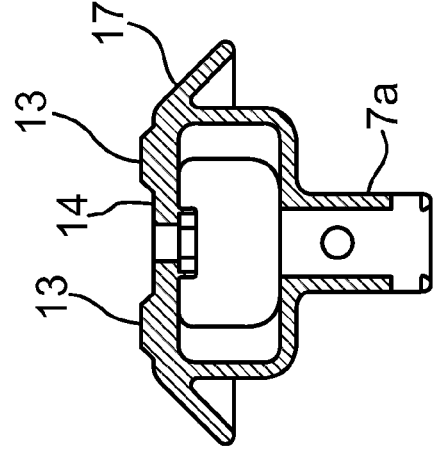

US 8,523,135 B2

BREAKAWAY DEVICE FOR POSTS

BACKGROUND OF THE INVENTION

Signs, lights, warnings, or markers are commonly placed on posts or other support members beside roads, highways, trails, or paths in order to notify, inform or warn passersby of a condition or situation that they are to be made aware of. These include, but are not limited to traffic signs, traffic lights, or roadside markers to mark the side of the road during times of deep snow or flooding. Being located close to roads, these signs, signals, lights, warnings, or markers are commonly impacted from any one of numerous directions by passing vehicles, or parts of vehicles, often causing the supporting post of the signs, signals, lights, warnings, or markers to be damaged beyond repair, requiring a need for the post to be replaced with a new one. This often involves considerable material expense as well as labor for the replacement of the post. Furthermore, during the time that the post is not functional, danger may arise to the passing vehicles and their occupants, as the signs, lights, warnings, or markers are not visible due to the failure of the post.

The breakaway device of the present invention facilitates the post to rupture at a pre-determined location regardless from which of numerous directions the post is impacted, and allows the post to be remounted in its desired position by merely replacing an inexpensive ruptured bolt or pin, or combination of bolts or pins. The need to replace the post itself is greatly reduced, and thus provides a "repaired" signpost in a minimum of time and expense. Once the device is ruptured, a top coupling component is separated from a bottom coupling component, but the top coupling component and post should remain loosely connected to the bottom coupling component via a length of safety wire or like item to avoid the post becoming a dangerous projectile to the vehicle that caused the rupture or to other vehicles, people, or property in the immediate area.

SUMMARY OF THE INVENTION

The device consists of two plate-like "coupling" components and a method for connecting said components to each other with one or more bolts or pins, or a combination of bolt(s) and pin(s), that will effectively secure the two components together. The two components consist of a convex-shaped bottom coupling component adapted to mate with and a concave-shaped top coupling component. The convex part of the bottom component faces upwards, and the concave part of the top component faces downwards, so that when they are coupled the convex part of the bottom component fits tightly in the concave part of the top component. The underside of the bottom component includes an arrangement for rigidly fastening the bottom component to a foundation or fixed position. The upper side of the top component includes an arrangement for rigidly fastening said top component to the post, pole or shaft upon which the signs, signals, lights, warnings, or markers are attached and elevated for easy and convenient viewing.

The configuration of the two coupling components is designed to urge the bolt or other connector to be subjected to tension, rather than solely a shearing action as in prior art signpost coupling arrangements, to cause failure of the said connector, so that the upper coupling component becomes disconnected from the bottom coupling component. The surface of the bottom component also contains at least one but possibly several small raised convex dimples, or bosses, that are positioned to fit into respective small concave recesses in the top component. This configuration may be reversed (i.e. boss on top, recess on bottom), but is not preferred. These meshing dimples and recesses are designed so that the upper component cannot rotate axially relative to the bottom component without causing the connecting bolt or pin to rupture. The convex shape of the bottom component, when inside the concave top component, causes the connecting bolt or pin into a state of tension, and possibly some shear, when the top component is forced to move relative to the bottom component. The bottom component is connected rigidly to the ground, normally through the use of a concrete foundation that includes a short mounting post, pole, shaft, or bracket to which the bottom component is rigidly fixed. This bottom component is intended to remain bolted rigidly to the concrete foundation or other fixed mounting device at all times and does not become disconnected in case of overload to the top component or the sign. When an overload condition arises on the breakaway assembly, the bolt or other connector that holds the two coupling components together comes under increasing tension as the top and bottom coupling components are urged to move away from each other, to a point where the connector ruptures, due to increased tension, allowing the two components to separate. Upon decoupling of the top component, the bottom component, when mounted rigidly to the foundation and when the top component has been disconnected due to overload, should remain fixed to the foundation in a position that is low enough to the ground so that a vehicle may pass over the bottom component and the foundation without damaging the vehicle.

An overload condition on the breakaway assembly may commonly arise when struck by a moving vehicle or part of a moving vehicle. The top and bottom coupling components should also be loosely connected with a cable or other like connecting device so that if the bottom component and the top component are no longer connected, the top component will be forced to remain physically close in position to the bottom component, which is rigidly connected to the foundation or other fixed mounting device.

DESCRIPTION OF THE DRAWINGS

FIGS. 3a to 3e are isolated views of the top coupling component in plan, in elevation, from beneath FIG. 3b, from the right side of FIG. 3b and in cross-section along the line e-e of FIG. 3d, respectively.

FIGS. 4a to 4d are isolated views of the bottom coupling component in plan, in elevation, from the right side of FIG. 4b and in cross-section along line a-a of FIG. 4c, respectively.

FIG. 6a is a partially transparent view of the components in an early stage of separation, where the top component is both sliding and lifting relative to the bottom component;

FIG. 6b is a partially transparent view from the right side of FIG. 6a; and FIG. 6c is a cross-section view along line a-a of FIG. 6c.

DESCRIPTION OF THE PREFERRED EMBODIMENTS

Figure 1A:
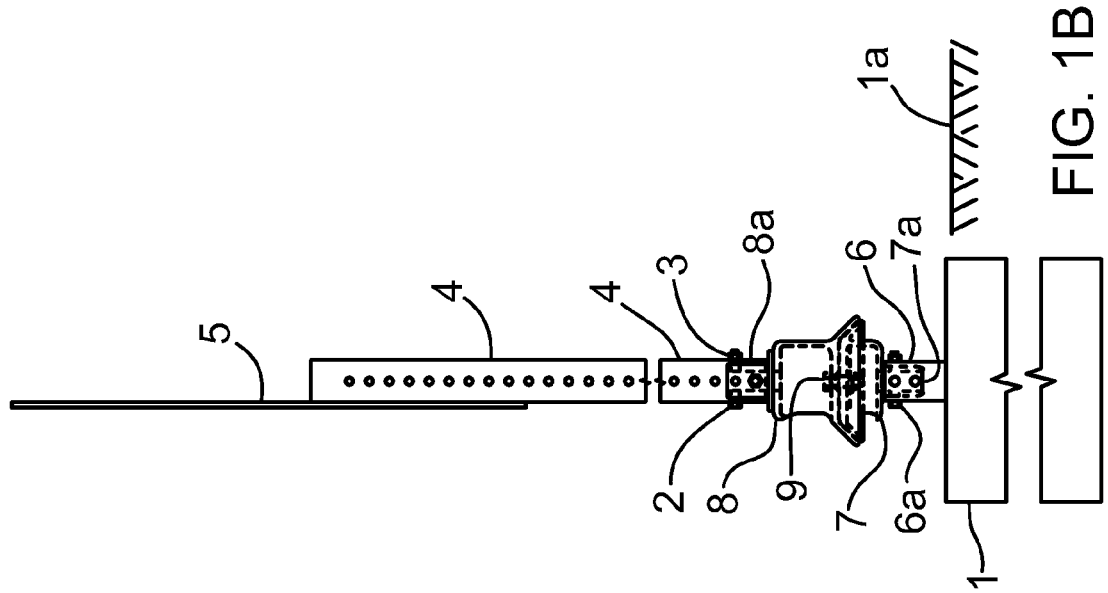
FIGS. 1a and 1b show front and side elevations, respectively, of the invention completely assembled including the signpost and the foundation. The signpost (4) and the foundation (1) are shown partially cut out for ease of illustration.
Figure 1B:
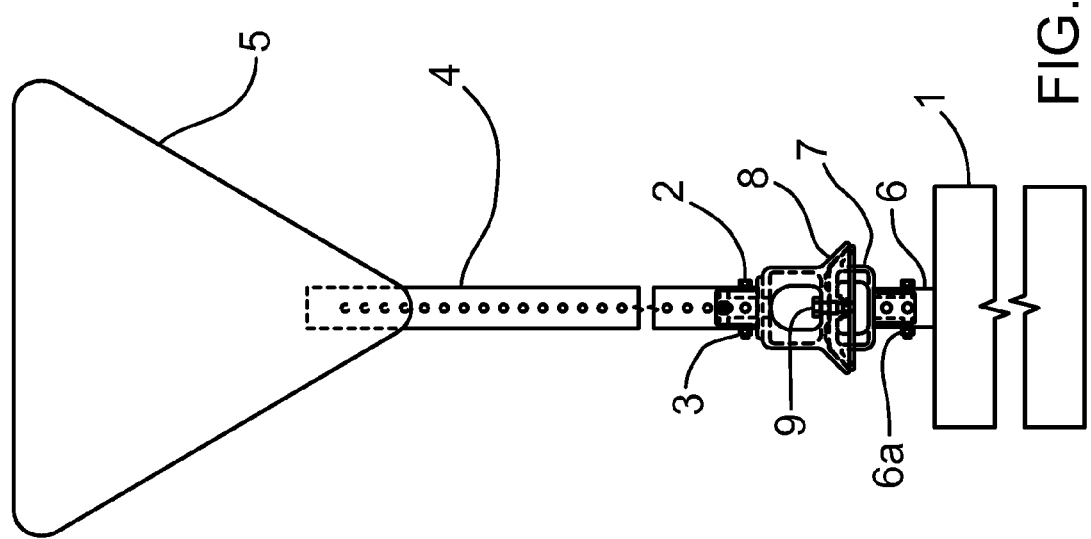

FIGS. 1a and 1b show a general arrangement of the preferred embodiment of the breakaway device of the present invention, secured to a post (4) and to a foundation (1). Typically, the top of the foundation (1) should be substantially level with the surrounding ground surface (1a), whether it is pavement, concrete, soil, or any other surface. On the top of the foundation (1) is a short hollow support (6), which is fixed to the foundation (1). The support (6) is intended to secure the neck (7a) of a first, or bottom, coupling component (7) to the foundation (1), as with nuts and bolts (6a). Also shown in this view is a second, or top, coupling component (8), having an upwardly extending neck 8a which is coupled to the hollow signpost (4), in this case using one or more machine screws (2) and nuts (3) to hold the machine screws (2) in place. The bottom component (7) is nested in and connected to the top component (8) by the use of a round headed, square shouldered machine screw (9) in this case, or alternately a support pin, held from below by another nut (3a). The top component in this view is secured to a signpost (4), as with nut and bolt assemblies which in this case mounts for easy display a traffic sign (5) which could be any type of traffic signs, signals, lights, warnings, or markers.

Figure 2:
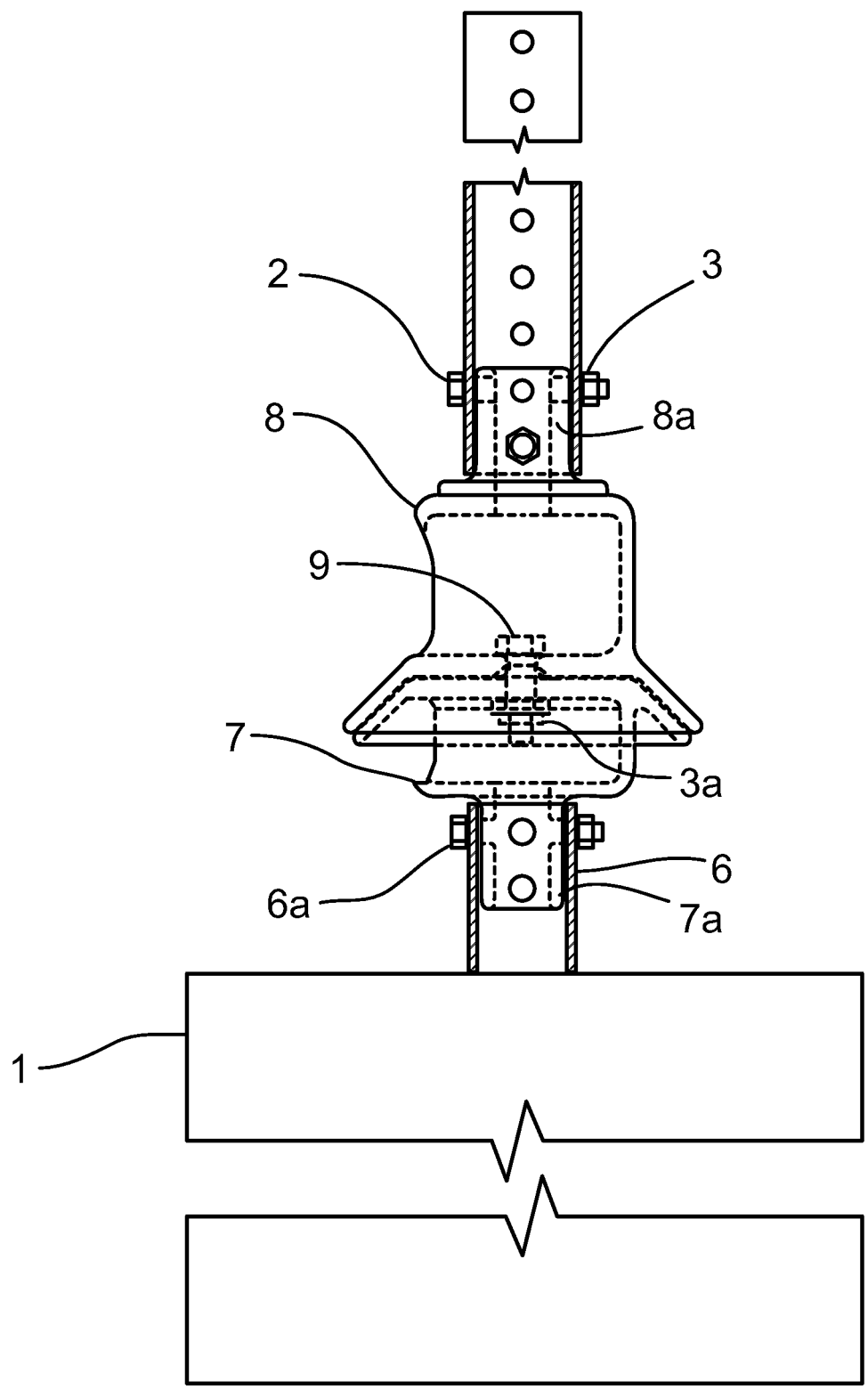
FIG. 2 is a more detailed view of the assembled breakaway device of the present invention connected to the signpost and foundation.

FIG. 2 shows in more detail the features of the invention in FIG. 1.

The bell-shaped top coupling component (8) in FIGS. 3a-3e has a conical recessed part (10) having a peripheral sidewall (10a) flared outwardly at an angle (A) of 45-degrees, as measured from the horizontal. This angle could be altered as is required to meet different operational requirements as may be encountered from time to time, from angles near zero degrees (i.e. a relatively "flat" plate) to angles near 90 degrees (i.e. nearly vertical sidewalls). The diameters (d) and (d1) of the top component, and that of the bottom component, may also be altered to meet different operational requirements. Certain ratios of angle (A) to diameter (d or d1) should provide desired breakaway characteristics for given operational requirements, examples of which are provided later. It should be noted that in this embodiment both the top component (8) and the bottom component (7) as viewed from above or below are essentially circular, and that this invention is intended to facilitate operation with shapes that are other than circular. This would also be intended to alter the operational characteristics of the invention as may be required from time to time to suit different requirements of the intended purpose. This view also shows a pair of diametrically opposed anti-rotation recesses (11) in the lower surface (12) of the concave part (10). In this case the invention shows that there are two anti rotation recesses, but the invention would facilitate different numbers and different shapes of these anti-rotation recesses in order to attain operational characteristics depending on the specific requirements which may be required of the invention. The sides (11a) of the recesses should be angled to accommodate movement of the components (7, 8) upon a breakaway condition. In the present embodiment the sides are sloped at the same angle (A) as the sidewall (10a) for optimal performance. The anti-rotation recesses (11) are designed to accept with a small interference fit anti-rotation bosses (13) in the upper surface (14) of the convex part (15) of the bottom component (7) (shown in FIG. 4b). Alternately, rotation of the top component (8) relative to the bottom component (7) could be prevented by locating the connecting bolt or pin (9) slightly eccentric (i.e. off-centre from the centerline 9a) to both components (7, 8), so that rotation of one component relative to the other component would cause interference between the components and arrest any relative rotational movement. Such eccentrically located bolt could be used either with or without the described bosses (13) and recesses (11). FIG. 3b also shows an opening (8b) to the cavity (9c) above bolt hole (9b) for access to the bolt (9) which fits therein, for easy installation or replacement of the bolt after rupture.

FIGS. 4a-4c show the bottom coupling component (7), having a generally convex mushroom-like shape. Also shown in this view is the angle (B) of the inclined peripheral sidewall (17) of the convex shape. This angle B should generally match the angle (A) to ensure both components (7,8) mate, but could be altered concurrently with angle A as is required to meet different operational requirements as may be encountered from time to time. It should be noted that in this case both the top component (8) and the bottom component (7) as viewed from above or below are essentially circular, and that this invention is intended to facilitate operation with shapes that are other than circular. This would also be intended to alter the operational characteristics of the invention as may be required from time to time to suit different requirements of the intended purpose. This view also shows the pair of circumferentially opposed anti-rotation bosses (13), described earlier, protruding from the bottom component (7). The tapered sides 13a of the bosses should match the slope of the recess walls 11a for proper mating of these components, and so should also match the angle (B) of the sidewall (17). In this case the invention shows that there are two anti-rotation bosses, but the invention would facilitate different numbers and different shapes of these anti-rotation bosses in order to attain operational characteristics depending on the specific requirements which may be required of the invention. The anti-rotation bosses are designed to fit into corresponding anti-rotation recesses inside the concave part of the top component (8). These figures also show an opening (7c) to a cavity (7b) beneath a bolt hole (9d) which aligns with the bolt hole (9b) from above for receiving the connecting bolt, for easy installation or replacement of the connecting nut (3a).

Figure 5C:
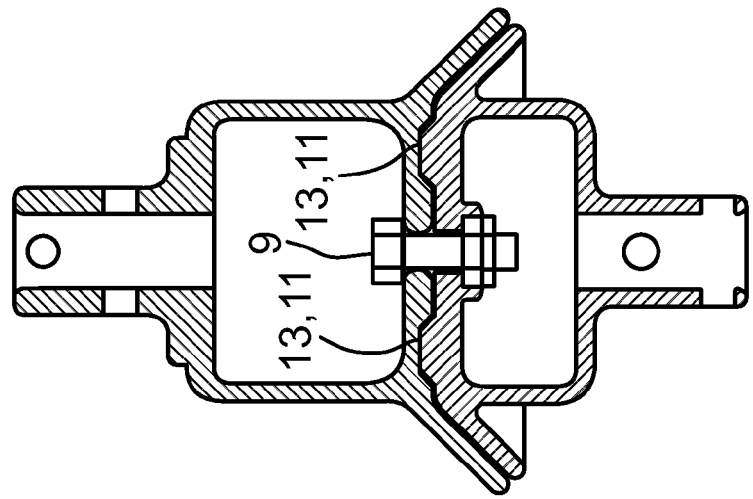
FIGS. 5a, 5b and 5c show, in isolation, the top coupling component connected to the bottom coupling component in elevation, from the right side of FIG. 5a and in cross-section along line a-a of FIG. 5b, respectively.
Figure 5B:
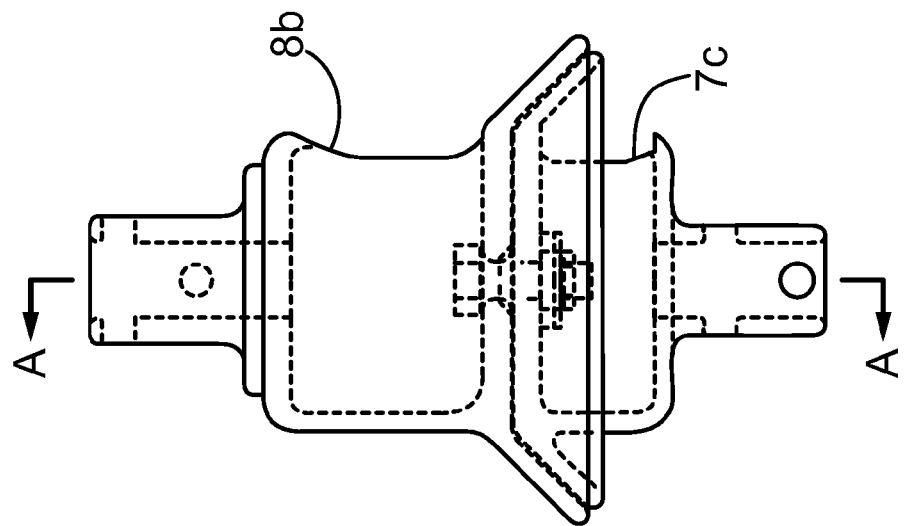
Figure 5A:
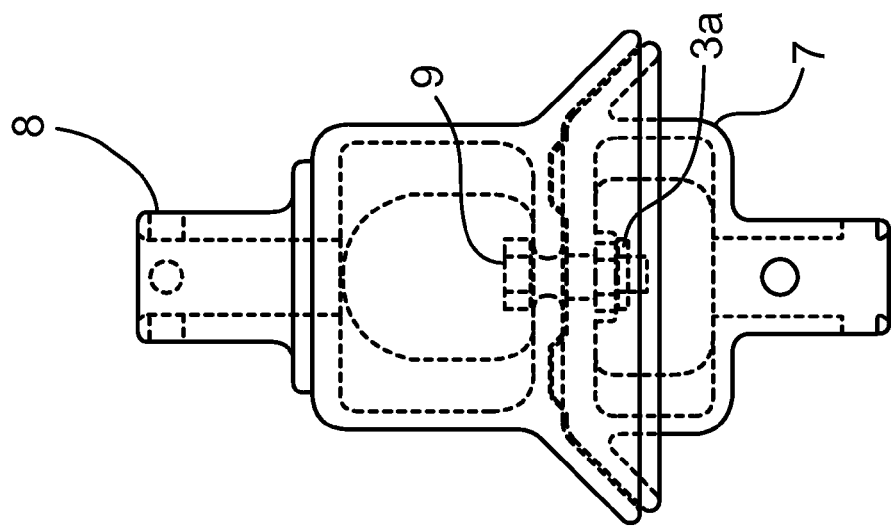

FIGS. 5a to 5c show the top and bottom components (7, 8) meshed and bolted (via bolt 9 and nut 3a) in an operational configuration.

Figure 6C:
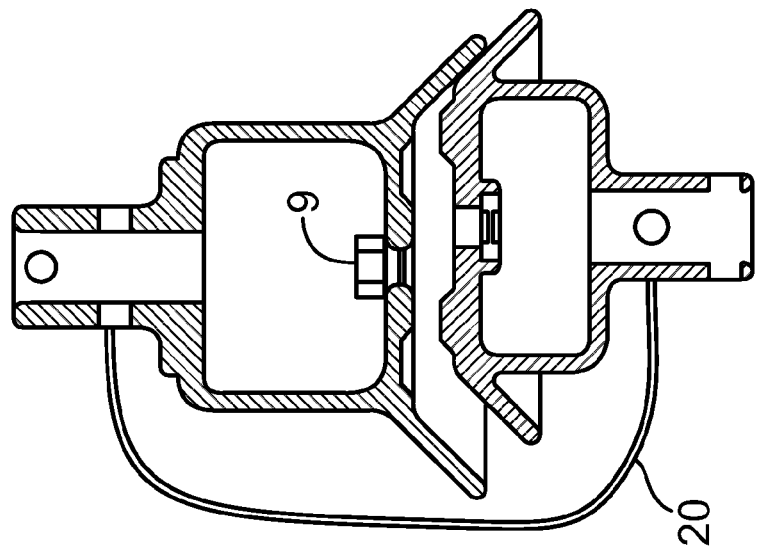
FIGS. 6a, 6b and 6c show the top coupling component and bottom coupling component as they encounter an overload condition and begin to separate from each other in the process of protecting the signpost and foundation from serious damage.
Figure 6B:
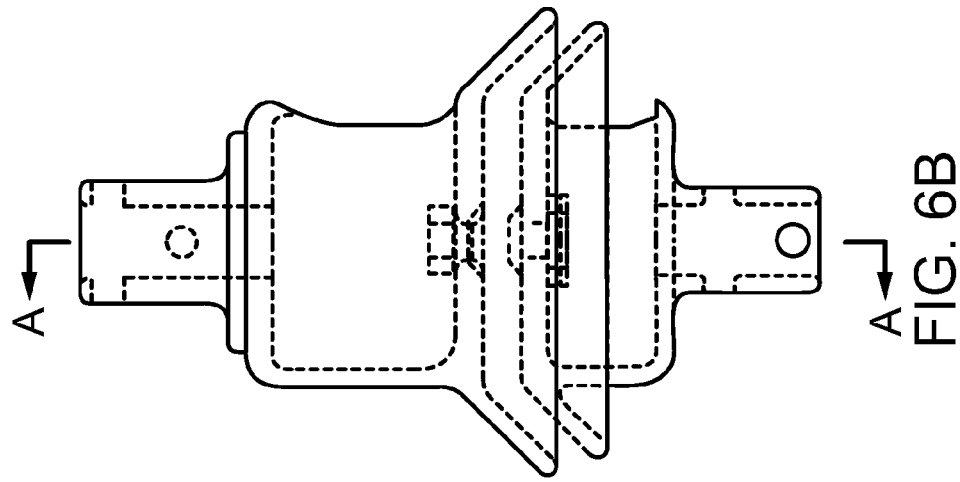
Figure 6A:
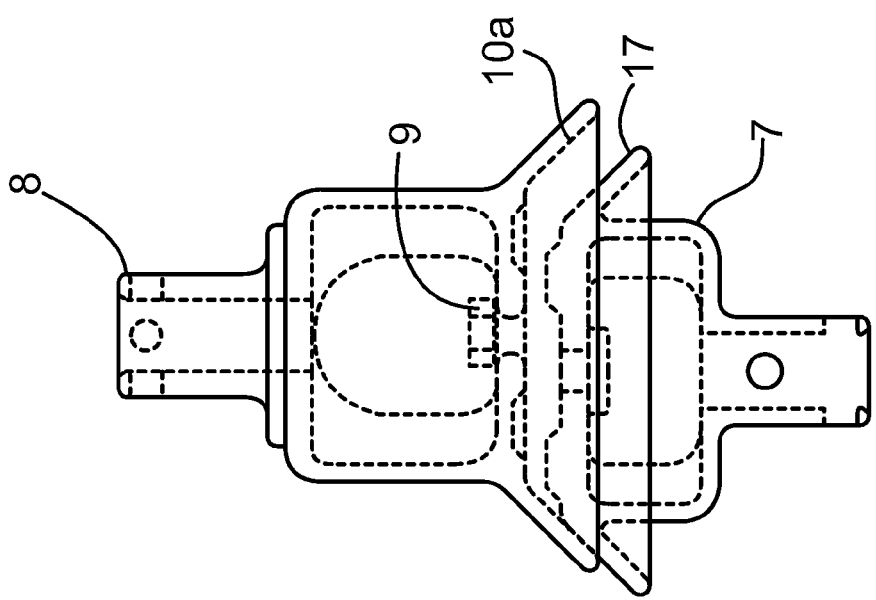

FIGS. 6a to 6c show the invention after it has encountered an overload situation, such as may happen if the signpost were to be struck by a vehicle or any other significant force. In this view, the top component (8) has been forced to separate from the bottom component (7) due to the angles of the mating sidewalls 17 and 10a of the two coupling components (7, 8), forcing the connecting bolt (9) to reach a condition of overtension resulting in the rupture of the bolt. In other words, as a lateral, or sideways, force is exerted on the signpost, the angle of the sidewalls (10a, 17) causes the top component (8) to exert a substantially upward axial force on the connecting bolt (9), although some lateral, or shearing, forces may also be encountered, depending on the angle of the sidewalls. With sufficient force on the signpost, the machine screw (9) will be forced to rupture after reaching its yield strength, and result in the separation of the top component from the bottom component, as shown further in these figures. The signpost may be put back in its original position by merely placing the top component (8) back onto the bottom component (7), and replacing the broken machine screw (9) with a new one, which is the only material that is required to re-assemble the signpost, thus restoring the traffic signs, signals, lights, warnings, or markers to a fully functional condition. It is noted that a length of safety line (20) should prevent the signpost and top component (8) from being thrown too far from its base (6).

Figure 7A:
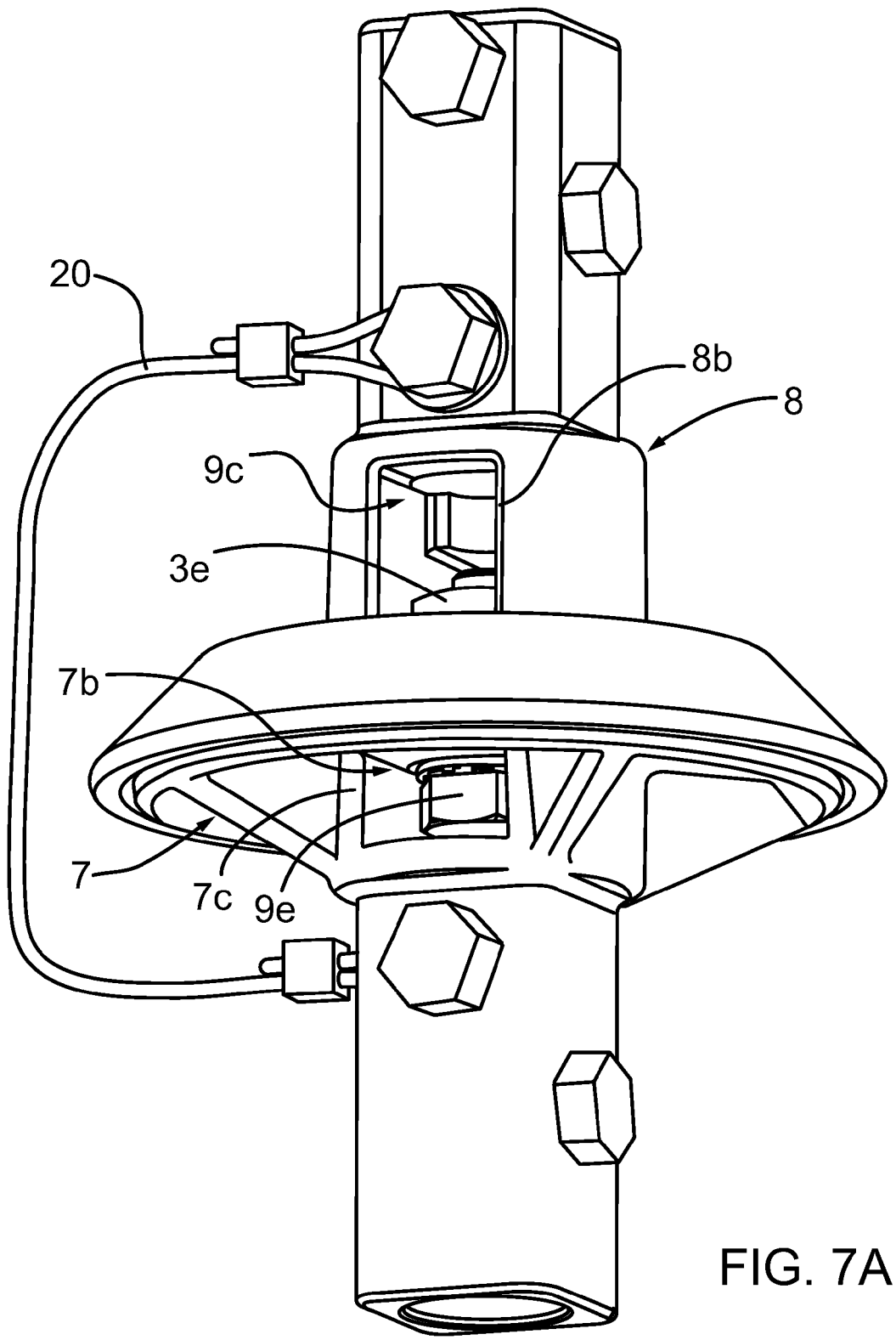
FIGS. 7a and 7b show an alternate embodiment of the invention in perspective and side views, respectively.
Figure 7B:
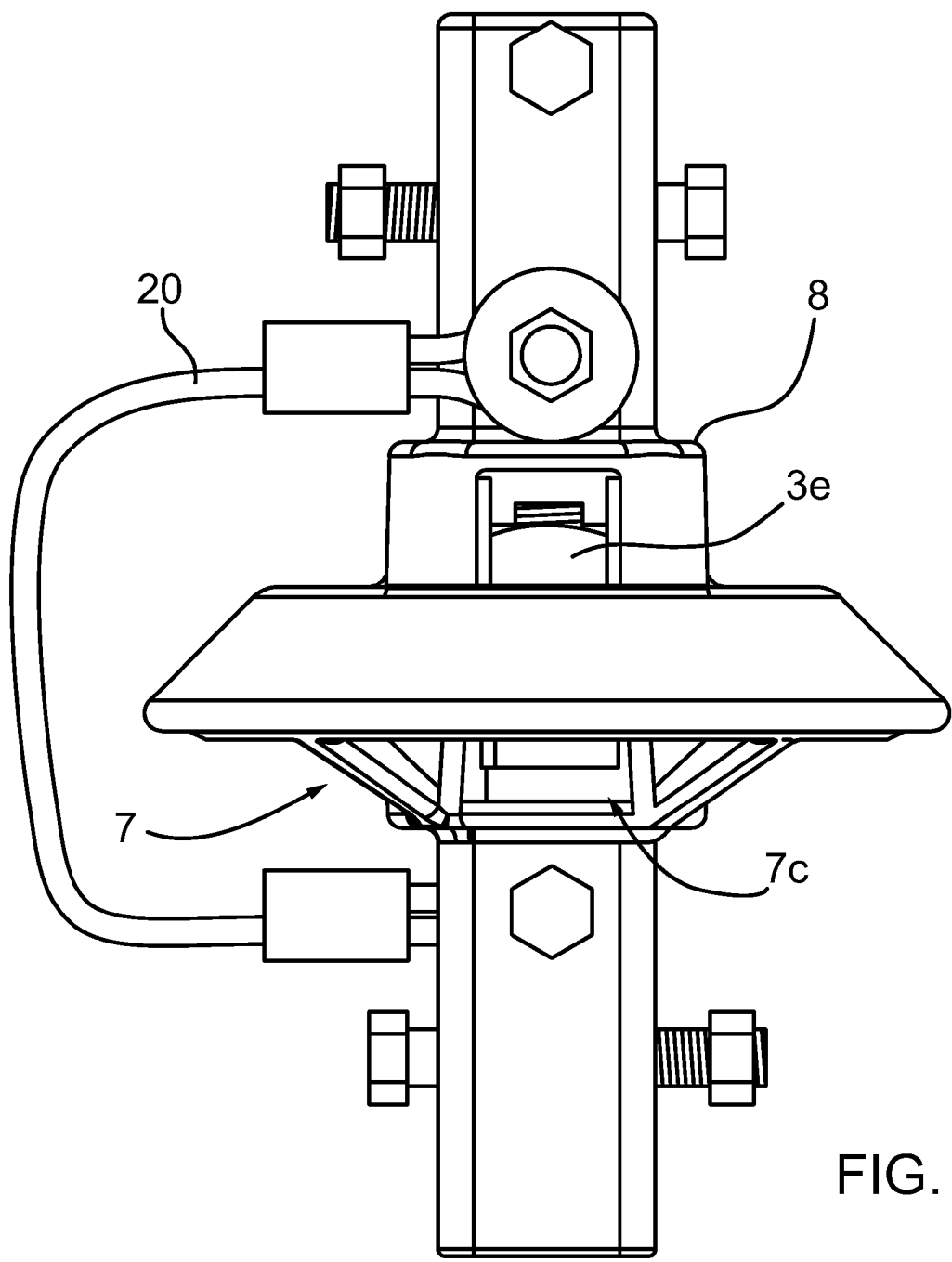

FIGS. 7a and 7b show an alternate embodiment of the invention in which the bell-shaped top coupling component (8) has been reconfigured to significantly reduce its size, both height and diameter, and a like reduction for the bottom coupling component (7). This is made possible by reversing the orientation of the fastener arrangement that secures the top and bottom components (8), (7), namely by mounting the bolt (9e) from below through the aligned bolt holes of the top and bottom components (identified as 9b and 9d earlier, but not seen or shown in the current views). In the top component (8) the opening and cavity (8b and 9c) are sized to slidingly receive the nut (3e) thereinto in such manner that the nut is aligned over the aforementioned bolt holes, and that the nut does not rotate when the bolt is inserted and rotated therein. The cavity (9c) and opening (8b) are therefore kept small since a wrench or other tool is not required to hold the nut in place when screwing or unscrewing. The nut (3e) is preferably placed in the cavity (9c) before a desired bolt is inserted into the bottom component (7) through its opening (7c) and cavity (7b), so that its shank engages the nut from below. The opening and cavity (7c and 7b) have been reduced (from the earlier described embodiment) and configured to accept the desired bolt (9e) and to fit an appropriate socket wrench or like tool over the bolt head to rotate the bolt when screwing or unscrewing.

Some of the many advantages and desirable features of the present invention may now be better understood:

The connecting bolt (9) is pulled primarily in tension due to the complimentary shaped conical configurations of the top and bottom components (7, 8). This configuration prevents the connecting bolt from encountering unabated shearing forces as in prior art signpost connectors which experience unwanted blowdowns from environmental conditions and lateral forces, such as wind gusts. The mating conical shapes should help resist some of the lateral forces.

The top and bottom components (7, 8) may be provided with conical shapes having angles A & B that range from 0 to 90 degrees, but preferably between 0 to 70 degrees, to suit different operational environments and requirements. The diameter (d) of the top and bottom components may also be altered to meet different operational requirements. Certain ratios of angle (A) to diameter (d) should provide desired breakaway characteristics. For instance:

i) In a test with top and bottom components each having a 7.75 inch diameter and lip angles A & B of 45 degrees, with a support pin 5/16 G2, a vehicle traveling at 25 kph broke the post from the base (i.e. the pin snapped) without any appreciable damage to either the signpost or to the breakaway device. The breakaway device was easily reassembled for reuse by merely replacing the pin.

ii) With the same configuration as in (i), but with the vehicle traveling at 40 kph, the post broke away from the base with slight damage to the post but no damage to the breakaway device, thus enabling further use of the signpost by reassembling the breakaway device with a new bolt.

iii) In a test with top and bottom components each having a 5.0 inch diameter and lip angles A & B of 45 degrees, with a support pin 3/8 G2, a vehicle traveling at 20 kph (kilometers per hour) broke the post from the base (i.e. the pin snapped) without any appreciable damage to either the signpost or to the breakaway device. The breakaway device was easily reassembled for reuse by merely replacing the pin.

The same breakaway device may be readily altered for different operational situations, for instance for low or high-speed impacts, by merely replacing the type of connecting bolt. For instance, a given breakaway device may be made suitable for a low-speed vehicle impact using a relatively strong grade 5 bolt (chosen for illustrative purposes), whereas the same breakaway device is made suitable for a high-speed impact by replacing the grade 5 bolt with a relatively "weaker" grade 2 bolt.

Alternately, rather than replacing the grade 5 bolt with a grade 2 or other type of bolt, the shank or like area of the grade 5 bolt may be machined down to provide a lower predetermined rupture strength. Thus, the same sized grade 5 bolts (and corresponding same nut 3A) may be used to alter the conditions (high-speed, low-speed, or other) under which the device will breakaway. Another advantage of this feature is that the ability to use a relatively larger bolt/nut (i.e. a machined grade 5 bolt in place of a smaller grade 2 bolt) has resulted in less damage (such as "egging") to the bolt holes (9b, 9d), as there appears to be less tendency for the larger bolt to pull through the holes during impact than the smaller bolt. Minimizing damage to the holes (9b, 9d) is desired to avoid premature replacement of the top and/or bottom components (8, 7). The machined bolt also appears to break more readily at the machined location, rather than at another location that can cause more damage to the holes (9b, 9d). Yet another advantage of using a larger but machined bolt in place of a smaller (unmachined) bolt is that the larger nuts for the larger bolts (as has been found with a 0.5 inch bolt) appear to have a significantly reduced tendency to back-off (i.e. loosen) after the top and bottom components are joined, to avoid premature and unwanted dislodging of the signpost from its base.

Unlike the prior art, the present invention is suitable for smaller signs, as well as larger ones.

In an alternate embodiment where the cavities 7b and 9c are not provided, then the necks 7a and 8a could be located off-centre on the respective components to provide space and access to the connecting bolt 9.

The present invention functions regardless from which direction force is exerted on the sign or signpost. In the preferred embodiment, the lateral force can take any 360 degree vector, and the breakaway device should function in the same manner.

More than one connector pin (9) may be used, and the one or more pins need not be located along the centerline of the post and breakaway device, but can be off-centre at different locations along the device.

The present breakaway device is not merely suitable for vertical signposts as shown herein, but should also be suitable for signposts of various orientations, such as horizontal posts. Hence, the terms "top" and "bottom" used for the coupling components, and any other like terms, are used to identify the specific orientation shown in the figures. The use of such terms is not intended to limit the device's use or orientation.

I claim:

1. A breakaway device for mounting a post to a foundation comprising:

a bottom coupling component having a generally planar upper surface with a first peripheral sidewall flared outwardly at a first incline from said upper surface, and a bottom neck opposite said upper surface for connection to said foundation;

a top coupling component having a generally planar lower surface with a second peripheral sidewall flared outwardly at a second incline from said lower surface, and a top neck opposite said lower surface for connection to said post, wherein said top coupling component nests with said bottom coupling component to position said first and second sidewalls in abutting relationship; and, at least one fastener;

wherein in a first mode said fastener connects said bottom and top coupling components and maintains said components nested during use, and in a second mode said fastener ruptures when said post is impacted with sufficient force to cause said second sidewall to slide relative to said first sidewall and exert a substantially axial force on said fastener to reach over-tension, allowing said top coupling component to separate from said bottom coupling component.

2. The device of claim 1 wherein each of said first and second inclines are complimentary.

3. The device of claim 2 wherein each of said first and second inclines are substantially 45 degrees from said upper and lower surfaces, respectively.

4. The device of claim 2 wherein each of said first and second inclines are in a range of up to 70 degrees from said upper and lower surfaces, respectively.

5. The device of claim 2 wherein said upper and lower surfaces have at least one pair of mating dimple and boss forming an interference fit to resist relative rotation of said upper and lower surfaces in said first mode.

6. The device of claim 5 wherein said dimple and boss each have tapered sides angled to generally match said complimentary inclines of said first and second peripheral sidewalls.

7. The device of claim 1 wherein each of said upper and lower surfaces are generally circular and each of said surfaces has a hole through the center thereof through which said fastener extends in said first mode.

8. The device of claim 1 wherein said each of said upper and lower surfaces are generally circular and each of said surfaces has a hole off-set from the center thereof through which said fastener extends for resisting relative rotation of said surfaces in said first mode.

9. The device of claim 1 further including a safety line attached between said top and bottom coupling components for maintaining said components in close proximity in said second mode.

10. The device of claim 1 wherein said fastener forms a nut and bolt arrangement, and said top coupling component has a cavity configured to slidingly receive said nut in alignment with a bolt hole in said top coupling component and to prevent rotation of said nut when said bolt is threaded therethrough.

11. The device of claim 1 wherein said fastener is selected from a group consisting of bolts of a given grade, size and machining to achieve a desired force at which said over-tension is reached.

12. A breakaway device for mounting a post to a fixed support comprising:

a first coupling component having a generally planar first surface with a first peripheral sidewall flared outwardly at a first incline from said first surface to form a convex shaped part, and a first neck for connection to said fixed support;

a second coupling component having a generally planar second surface with a second peripheral sidewall flared outwardly at a second incline from said second surface to form a conical shaped part, and a second neck for connection to said post, wherein said conical shaped part is configured to nest with said convex shaped part to mate said first and second sidewalls; and, at least one replaceable fastener having a first mode wherein said fastener connects said first and second coupling components and maintains said components nested, and a second mode wherein said fastener ruptures substantially in tension when said post is impacted with sufficient force, thereby releasing said second coupling component from said first coupling component.

13. The device of claim 12 wherein said first and second inclines are substantially 45 degrees from said first and second surfaces, respectively.

14. The device of claim 12 wherein said first and second inclines are in a range of up to 70 degrees from said first and second surfaces, respectively.

15. The device of claim 12 wherein said first and second surfaces have at least one pair of mating dimple and boss forming an interference fit to resist relative rotation of said first and second coupling components in said first mode.

16. The device of claim 15 wherein said dimple and boss each have complimentary tapered sides angled to avoid interfering with the release of said first and second coupling components in said second mode.

17. The device of claim 12 wherein said fastener extends through the centre of each of said first and second surfaces in said first mode.

18. The device of claim 12 wherein said fastener is off-set from the centre of each of said first and second surfaces for resisting relative rotation of said first and second coupling components in said first mode.

19. The device of claim 12 wherein said fastener forms a nut and bolt arrangement, and said second coupling component has a cavity configured to slidingly receive said nut in alignment with a bolt hole in said second coupling component, and to prevent rotation of said nut when said bolt is threaded therethrough.

20. The device of claim 12 wherein said fastener is selected from a group consisting of bolts of a given grade, size and machining to manipulate the force at which said fastener ruptures.

* * * * *